(12) United States Patent
Gifford

(10) Patent No.: US 7,134,235 B2
(45) Date of Patent: Nov. 14, 2006

(54) FISHING DEVICE

(76) Inventor: R. Harold Gifford, 405 Plymouth Rd., Gwynedd Valley, PA (US) 19437

( * ) Notice: Subject to any disclaimer, the term of this patent is extended or adjusted under 35 U.S.C. 154(b) by 0 days.

(21) Appl. No.: 10/367,637

(22) Filed: Feb. 14, 2003

(65) Prior Publication Data

US 2004/0159037 A1    Aug. 19, 2004

(51) Int. Cl.
*A01K 97/00* (2006.01)
*A01M 31/06* (2006.01)

(52) U.S. Cl. .................................. 43/4; 43/2
(58) Field of Classification Search .............. 43/2, 43/4
See application file for complete search history.

(56) References Cited

U.S. PATENT DOCUMENTS

| | | | |
|---|---|---|---|
| 2,895,249 A * | 7/1959 | Carruthers | 43/4 |
| 2,933,847 A * | 4/1960 | Frasure | 43/42.74 |
| 3,186,120 A * | 6/1965 | Layson | 43/2 |
| 4,550,518 A * | 11/1985 | Layson | 43/2 |
| 4,607,447 A * | 8/1986 | Wright | 43/3 |
| 4,672,764 A * | 6/1987 | Dempsey | 43/4 |
| 4,831,765 A * | 5/1989 | Bradshaw | 43/42.32 |
| 5,906,067 A * | 5/1999 | Layson | 43/2 |
| 5,950,345 A * | 9/1999 | Kilander | 43/2 |
| 6,269,582 B1 * | 8/2001 | Feld | 43/4 |

OTHER PUBLICATIONS

"3D Fish Shower Curtain"; Eldridge Textile Co., Inc; www.eldridgetextile.com; copyright 1997-2004.*

* cited by examiner

*Primary Examiner*—Michael J. Carone
*Assistant Examiner*—Bret Hayes
(74) *Attorney, Agent, or Firm*—Morgan, Lewis & Bockius LLP

(57) ABSTRACT

A fishing device includes a pliable sheeting material with one or more fish shaped decals adhered to the surface of the sheeting material and at least one line attachment that attaches a fishing line or fishing leader to the sheeting material. The sheeting material may be of various shapes and sizes. The fished shaped decals adhered to the sheeting material may include a plurality of decals of various sizes and shapes. The fish shaped decals may be holograms. The fish shaped decals may also be interchangeable.

3 Claims, 5 Drawing Sheets

FISHING DEVICE

BACKGROUND OF THE INVENTION

1. Field of the Invention

The present invention is related to the field of fishing devices and lures, and in particular, to a fishing device which provides fish-attracting appearance and movements. More specifically, the present invention is related to various embodiments of a fishing device comprised of pliable sheeting material with one or more fish shaped decals adhered to the surface of the sheeting material and at least one line attachment providing means for attaching a fishing line or fishing leader to the sheeting material.

2. Description of the Background

Those individuals involved in fishing, whether as a sporting and recreational activity or as a commercial enterprise, are interested in attracting and catching fish with the greatest efficiency possible. Fishing devices, lures and baits have long been used as a means for increasing ones catch. This is typically accomplished by attracting fish to the bait or lure and encouraging the fish to take the bait or lure, along with an attached hook. Because such baits and lures attract fish with varying rates of success, anglers often spend considerable effort in attempting to determine which baits or lures will attract fish under certain types of conditions.

Over many years, anglers have tried a multitude of baits and lures varying nearly every aspect, including, shape, size, color and movement. Anglers have added scents, sounds and tastes to lures. They have created lures which skim the waters surface and those which dive to great depths. Despite these many variants, one fish attracting method which has seen little success is the use of a fish attracting device which mimics through appearance and movement, a school of fish comprised of the preferred prey of the species sought by the angler.

When certain fish locate a school of their preferred prey, the fish are attracted to the school by the opportunity to feed. However, not all fish are attracted to the same type of prey. For example, some fish are attracted to mullet, others to squid and still others to ballyhoo.

Accordingly, a need will be seen for a fishing device which attracts fish by creating the appearance of individual fish or schools of fish which are the preferred prey of the fish sought by the angler. A further need will be seen for such a fishing device where the fishing device can be altered to mimic the prey of various species of fish.

SUMMARY OF THE INVENTION

The present invention relates to various embodiments of a fishing device comprised of pliable sheeting material with one or more fish shaped decals adhered to the surface of the sheeting material and at least one line attachment providing means for attaching a fishing line or fishing leader to the sheeting material. The sheeting material is pliable, and may be manufactured from any number of suitable materials, though sheeting material selected from the group consisting of polyethylene, polypropylene, or polyvinyl chloride is preferred. The sheeting material may be of various shapes, lengths and widths. The fished shaped decals adhered to the sheeting material may include a plurality of decals of various sizes and shapes. The fish shaped decals may be holograms. The fish shaped decals may also be interchangeable.

When the fishing line attached to the line attachment is pulled, moving the fishing device through the water, the sheeting material trails behind the line attachment creating the image of one or more fish or a school of fish moving in the water. When the sheeting material is clear and pliable, it becomes less visible once placed in the water. When the fish shaped decals adhered to the sheeting material are holograms, a three dimensional fish shaped image is created. When fishing for a certain species of fish, specific shapes and sizes of fish shaped decals are used to mimic the prey of that species. The fish shaped decals are interchangeable allowing for the pursuit of various species of fish. In several embodiments of the present invention, the fishing device is used to attract fish. The fish may then be caught using another fishing device or lure which contains a hook. In other embodiments of the present invention, the fishing device may contain a fishing hook allowing the device itself to be used to catch fish.

The fishing device of the present invention may be pulled through the water to create the image of fish or a school of fish moving through the water. The fishing device may be pulled by hand, pulled by use of a fishing rod and reel, or may be pulled behind a moving vessel. The fishing device may also be used in still or moving water, such as a stream, lake, pond or river, where the fishing device remains relatively stationary and the water moves past the fishing device creating the image of fish or a school in the water.

In one embodiment of the present invention, the sheeting material comprises a rectangular blanket and the fish shaped decals are adhered to at least one surface of the sheeting material. In another embodiment of the present invention, the sheeting material comprises a narrow strip and the fish shaped decals are adhered to at least one surface of the sheeting material.

The fishing device of the present invention may also include means for attracting fish, including various color, reflective, sound, motion, scent, and taste attractants. In a further aspect of the present invention, the fishing device may include means for attaching a fishing hook, lure, bait or teaser.

In accordance with a further aspect of the present invention, the sheeting material is attached to a rigid bar extending the length of at least one edge of the sheeting material. The fish shaped decals are adhered to the sheeting material and at least one line attachment provides means for attaching a fishing line or fishing leader to one or more points on the rigid bar. When the fishing line is pulled moving the fishing device through the water, the sheeting material trails behind the rigid bar and the fish shaped decals adhered to the sheeting material create the image of individual fish or a school of fish moving in the water. In a further aspect of the present invention, the sheeting material is attached to a rigid pulling device which is attached to two corners of the sheeting material. The sheeting material attached to the rigid bar or pulling device may be of various shapes, lengths and widths and may be clear or colored. The fished shaped decals adhered to the sheeting material may be uniform in appearance or may include a plurality of decals of various sizes and shapes. The fish shaped decals may be holograms and may also be interchangeable. The fishing line or fishing leader may extend the length of the sheeting material and, where the fishing line passes the end of the sheeting material opposite the rigid bar or pulling device, the fishing line or leader may be attached to a fishing hook, lure, bait or teaser.

In accordance with a further aspect of the present invention, movable paddles are attached to each end of the rigid bar attached to the sheeting material. The movable paddles may be adjusted to angle upwards or downwards causing the fishing device to move in the selected direction when pulled through the water. In another aspect of the present invention, the rigid bar or pulling device is buoyant. The sheeting material attached to the rigid bar or pulling device floats on the surface of the water behind the rigid bar or pulling device and creates the image of individual fish or a school of fish moving near the surface of the water.

In accordance with a further aspect of the present invention, the sheeting material is attached to a rigid hoop. At least one fish shaped decal is adhered to the sheeting material and at least one line attachment provides means for attaching a fishing line or fishing leader to the rigid hoop. One edge of the sheeting material is attached to the rigid hoop forming a cylinder and the two opposing edges of the sheeting material are sealed together enclosing the cylinder. Rigid hoops of various sizes may be used to create various sizes of fishing devices. The sheeting material attached to the rigid hoop may be of various lengths and widths and may be clear or colored. The fished shaped decals adhered to the sheeting material may be uniform in appearance or may include a plurality of fish shaped decals of various sizes and shapes. The fish shaped decals may be holograms and may also be interchangeable. The fishing line or fishing leader may extend the length of the cylinder of sheeting material and, where the fishing line exits through the end of the cylinder opposite the rigid hoop, the fishing line or leader may be attached to a fishing hook, lure, bait or teaser.

In accordance with a further aspect of the present invention, the sheeting material is attached to a rigid frame having at least two rigid arms extending outward from a central hub to which the arms are affixed. One edge of a strip of the sheeting material is attached to each arm of the rigid frame. At least one fish shaped decal is adhered to at least one side of each strip of the sheeting material. At least one line attachment provides means for attaching a fishing line or fishing leader to the rigid frame. Rigid frames of various sizes may be used to create various sizes of fishing devices. The sheeting material attached to the rigid frame may be of various lengths and widths and may be clear or colored. The fished shaped decals adhered to the sheeting material may be uniform in appearance or may include a plurality of fish shaped decals of various sizes and shapes. The fish shaped decals may be holograms and may also be interchangeable. The fishing line or fishing leader may extend the length of the sheeting material and, where the fishing line passes the end of the sheeting material opposite the rigid frame, the fishing line or leader may be attached to a fishing hook, lure, bait or teaser.

In accordance with a further aspect of the present invention, the sheeting material is a narrow strip of sheeting material and at least one fish shaped decal is adhered to at least one surface of the sheeting material. At least one line attachment provides means for attaching a fishing line or fishing leader to one edge of the strip of the sheeting material. The strip of sheeting material may be of various lengths and widths and may be clear or colored. The fished shaped decals adhered to the sheeting material may be uniform in appearance or may include a plurality of fish shaped decals of various sizes and shapes. The fish shaped decals may be holograms and may also be interchangeable. The fishing line or fishing leader may extend the length of the sheeting material and, where the fishing line passes the end of the sheeting material opposite the line attachment, the fishing line or leader may be attached to a fishing hook, lure, bait or teaser.

In accordance with a further aspect of the present invention, a first fish shaped decal contains a holographic image of a fish on one side and the opposing side contains an adhesive material coating the surface of the first fish shaped decal. A fishing line or fishing leader is disposed along a longitudinal axis of the first fish shaped decal whereby a fishing hook, lure, bait or teaser attached to the fishing line or fishing leader extends beyond one end of the first fish shaped decal. A second fish shaped decal, which contains a holographic image of a fish on one side and is a mirror image of the first fish shaped decal, is disposed against the adhesive side of the first fish shaped decal, thereby enclosing a portion of the fishing line or fishing leader between the first and second fish shaped decals. The first and second fish shaped decals, each a mirror image of the other, are attached along the side of the decal that does not contain the holographic image of a fish, resulting in a holographic image of a fish visible on both sides of the attached first and second fish shaped decals. The fish shaped decals may be manufactured from any number of suitable materials, though decals made of Mylar are preferred. The fish shaped decals may be of various sizes and shapes. The fish shaped decals may also include means for attracting fish selected from the group consisting of color, reflection, sound, motion, scent, and taste attractants.

BRIEF DESCRIPTION OF THE DRAWINGS

For the present invention to be clearly understood and readily practiced, the present invention will be described in conjunction with the following figures, wherein like referenced numerals are employed to designate like parts or steps, are incorporated into and constitute a part of this specification, and illustrate embodiments of the invention that together with the description serves to explain the principals of the invention. In the drawings.

DETAIL DESCRIPTION OF THE PREFERRED EMBODIMENT

Reference will now be made in detail to the preferred embodiments of the present invention, examples of which are illustrated in the accompanying drawings. It is to be understood that the figures (FIG.s) and descriptions of the present invention included herein illustrate and describe elements that are of particular relevance to the present invention, while eliminating, for purposes of clarity, other elements. Those of ordinary skill in the art will recognize that other elements are desirable and/or required in order to implement the present invention. However, because such elements are well known in the art, and because they do not facilitate a better understanding of the present invention, a discussion of such elements is not provided herein.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately, or in any suitable combination.

It is to be recognised that various alterations, modifications, and/or additions may be introduced into the constructions and arrangements of parts described above without departing from the spirit or ambit of the present invention.

The embodiments described above are intended to provide a preferred embodiment of the present invention as currently contemplated by the applicant. It would be obvious to anyone of skill in the art based on the above-described examples that numerous modifications could be made to the described preferred embodiments. Accordingly, the embodiments described herein are merely exemplary in nature and are not intended to represent every possible embodiment of the present invention.

Figure 1:
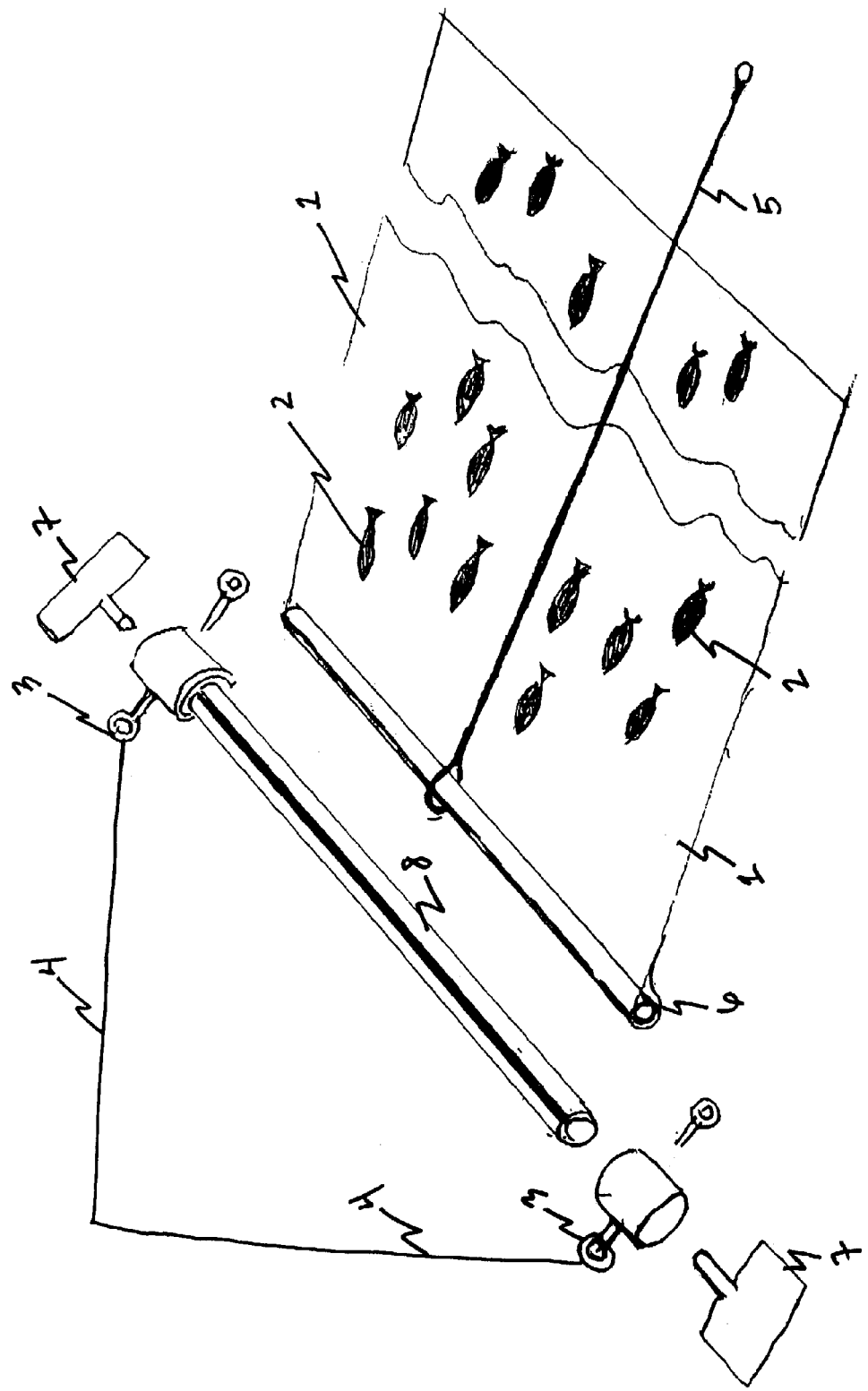
FIG. 1 shows a view of one embodiment of the fishing device according to the present invention.

FIG. 1 shows an embodiment of the fishing device according to the present invention where the sheeting material (1) has adhered to its surface one or more fish shaped decals (2). Each decal (2) has means on one side of the decal (2) for adhering the decal (2) to the sheeting material (1). The sheeting material (1) has at least one line attachment (3) providing means for attaching a fishing line (4) or fishing leader (4) to at least one point on the sheeting material (1). The sheeting material (1) is comprised of pliable plastic material which, in a preferred embodiment, is selected from the group consisting of polyethylene, polypropylene, or polyvinyl chloride. The sheeting material (1) is sufficiently pliable to allow it to flex as it is passed through water or as water passes over it causing the decals (2) adhered to the sheeting material (1) to appear to be moving. The fished shaped decals (2) adhered to the sheeting material (1) may be uniform in appearance or may include a plurality of fish shaped decals (2) of various sizes and shapes. The fish shaped decals (2) may be holograms and may also be interchangeable. The fishing device may also include means for attracting fish, including modifying the sheeting material (1) or the fish shaped decals (2) to incorporate various colors, reflective patterns, holograms, sounds, motions, scents, and taste attractants. The fishing device can also be modified so that the sheeting material (1) guides the fishing line (4) to include means for attaching a fishing hook, lure, bait or teaser (5) behind the sheeting material (1). In another aspect of the present invention, the fish shaped decals (2) are interchangeable.

In one embodiment of the invention shown in FIG. 1, the sheeting material (1) comprises a rectangular blanket and the fish shaped decals (2) are adhered to at least one surface of the sheeting material (1).

In a further embodiment of the present invention, the fishing device comprises clear, pliable sheeting material (1) attached to at least one rigid bar (6) extending the length of at least one side of the sheeting material (1). One or more fish shaped decals (2), with means on one side of the decal (2) for adhering the decal (2) to the sheeting material (1), are adhered to the sheeting material (1). At least one line attachment (3) provides means for attaching fishing line (4) or fishing leader (4) to at least one point on the rigid bar (6).

In accordance with a further aspect of the present invention, movable paddles (7) are attached to each end of the rigid bar (6). In accordance with a further aspect of the present invention, the rigid bar (6) is buoyant. To provide the rigid bar (6) with buoyancy, the rigid bar (6) may be encased in or replaced with a flotation device (8).

Figure 2:
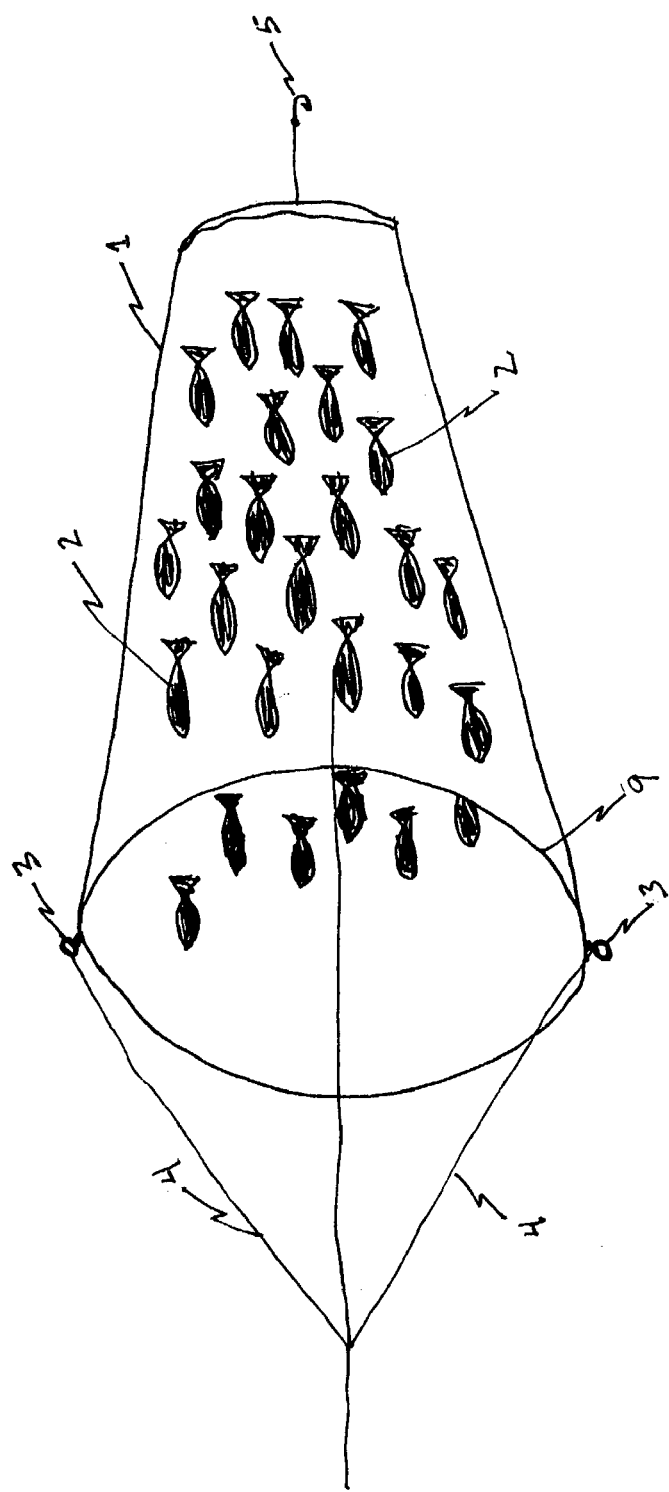
FIG. 2 shows a view of another embodiment of the fishing device according to the present invention where the sheeting material is attached to a rigid hoop and the device is shaped as a cylinder.

FIG. 2 shows another embodiment of the fishing device according to the present invention where the sheeting material (1) is attached to a rigid hoop (9) forming a cylinder, where the two opposing edges of the sheeting material (1) attached to the rigid hoop (9) are sealed together. The line attachment (3) connects the rigid hoop (9) to the fishing line (4) or fishing leader (4). The sheeting material (1) has adhered to its surface one or more fish shaped decals (2). Each decal (2) has means on one side of the decal (2) for adhering the decal (2) to the sheeting material (1). The fished shaped decals (2) can be employed in various sizes and shapes. The fish shaped decals (2) can also be holograms. The fishing device may also include means for attracting fish, including modifying the sheeting material (1) or the fish shaped decals (2) to incorporate various colors, reflective patterns, holograms, sounds, motions, scents, and taste attractants. The fishing device may also be modified so that the cylinder formed from the sheeting material (1) guides the fishing line (4) through the cylinder and includes a means for attaching a fishing hook, lure, bait or teaser (5) behind the sheeting material (1) cylinder.

Figure 3:
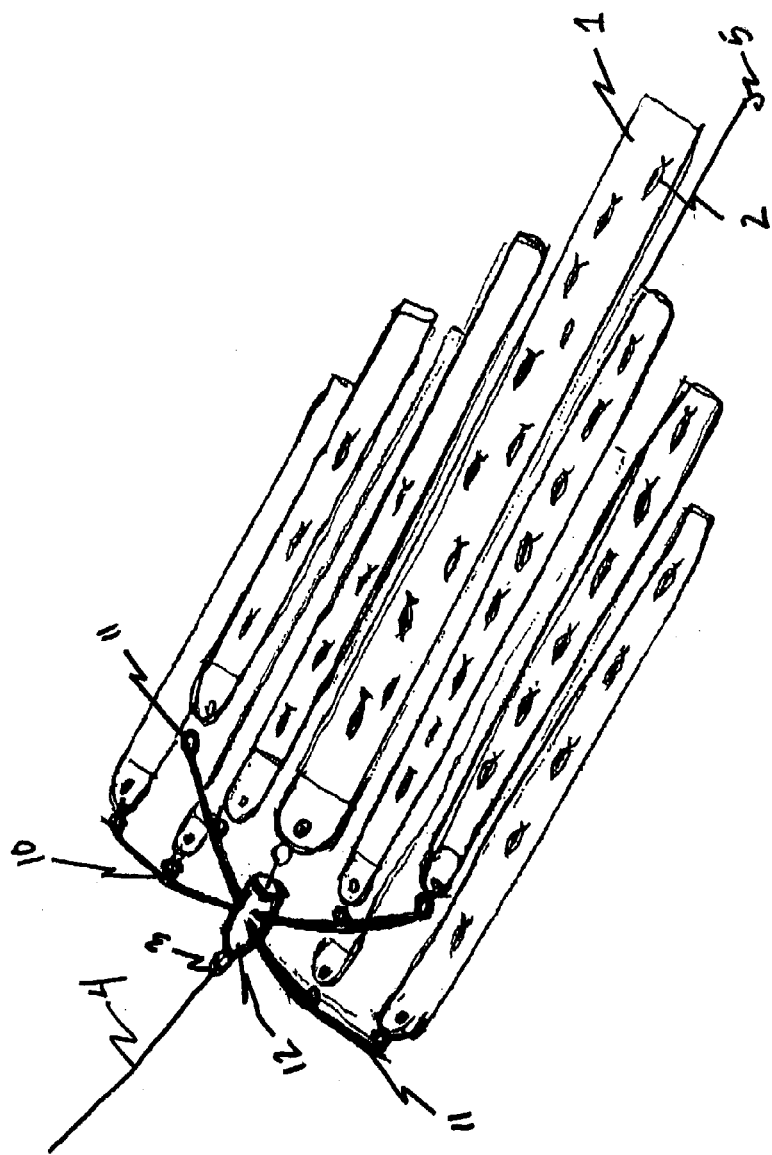
FIG. 3 shows a view of another embodiment of the fishing device according to the present invention where strips of the sheeting material are attached to a rigid frame.

FIG. 3 shows another embodiment of the fishing device according to the present invention where the sheeting material (1) is attached to a rigid frame (10) having at least two rigid arms (11) extending outward from a central hub (12) to which the arms (11) are affixed. One edge of a strip of the sheeting material (1) is attached to each arm (11) of the rigid frame (10). At least one fish shaped decal (2) is adhered to at least one side of each strip of the sheeting material (1). At least one line attachment (3) provides means for attaching a fishing line or fishing leader (4) to the rigid frame (10). Rigid frames (10) of various sizes may be used to create various sizes of fishing devices. The sheeting material (1) attached to the rigid frame (10) may be of various lengths and widths and may be clear or colored. The fished shaped decals (2) adhered to the sheeting material (1) may be uniform in appearance or may include a plurality of fish shaped decals (2) of various sizes and shapes. The fish shaped decals (2) may be holograms and may also be interchangeable. The sheeting material (1) or the fish shaped decals (2) may be modified to incorporate various colors, reflective patterns, holograms, sounds, motions, scents, and taste attractants. The fishing device can also be modified so that the rigid frame (10) guides the fishing line (4) through the sheeting material (1) strips and includes a means for attaching a fishing hook, lure, bait or teaser (5) behind the sheeting material (1) strips.

Figure 4:
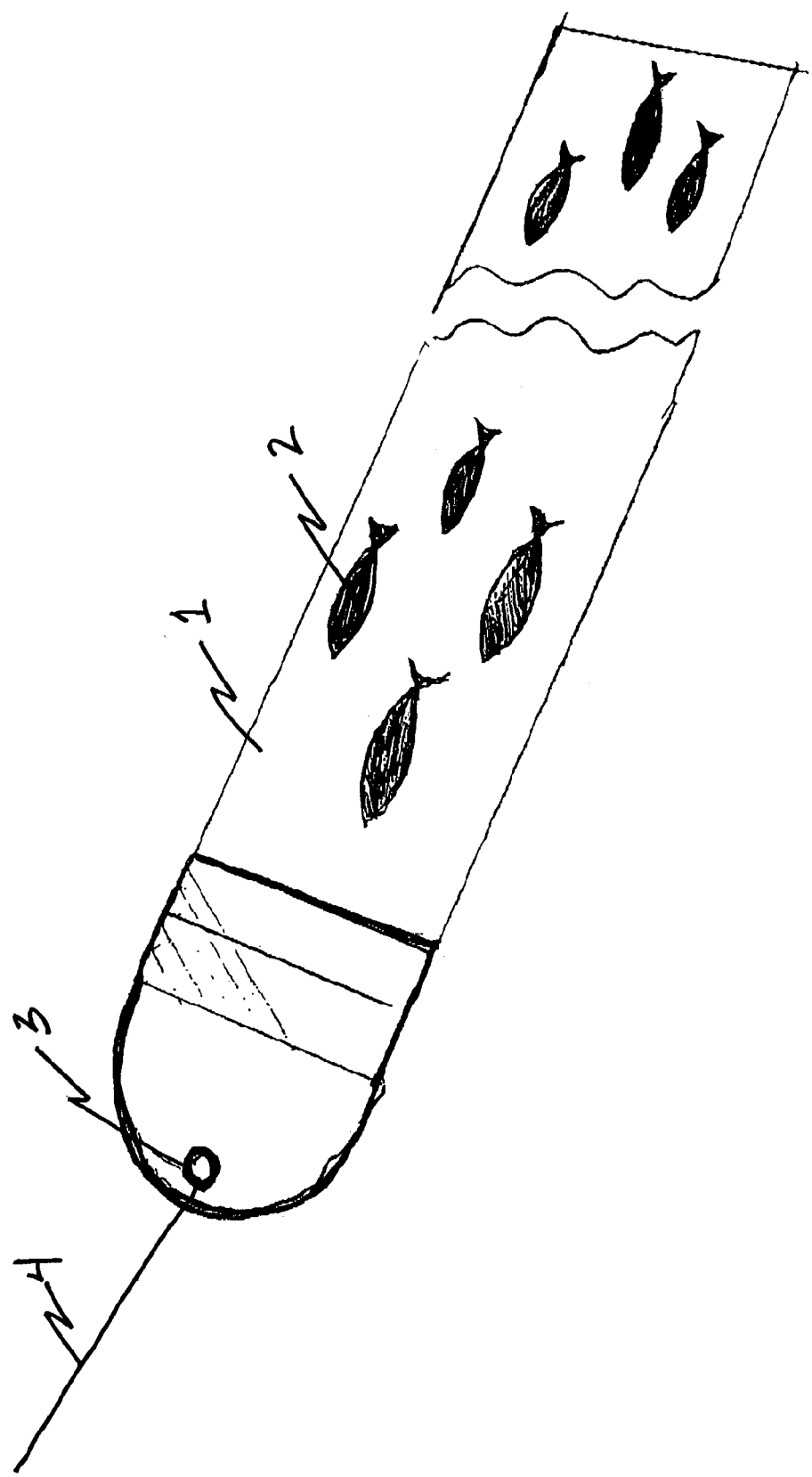
FIG. 4 shows a view of another embodiment of the fishing device according to the present invention where the sheeting material is formed in strips.

FIG. 4 shows another embodiment of the fishing device according to the present invention where the sheeting material (1) comprises a strip and the fish shaped decals (2) are adhered to at least one surface of said sheeting material (1). The sheeting material (1) strip may be of various lengths and widths and may be clear or colored. The fished shaped decals (2) adhered to the sheeting material (1) may be uniform in appearance or may include a plurality of fish shaped decals (2) of various sizes and shapes. The fish shaped decals (2) may be holograms and may also be interchangeable. The sheeting material (1) or the fish shaped decals (2) may be modified to incorporate various colors, reflective patterns, holograms, sounds, motions, scents, and taste attractants. The sheeting material (1) strip can also be modified so that it guides the fishing line (4) through or along the sheeting material (1) strip and includes a means for attaching a fishing hook, lure, bait or teaser (5) behind the sheeting material (1) strip.

Figure 5:
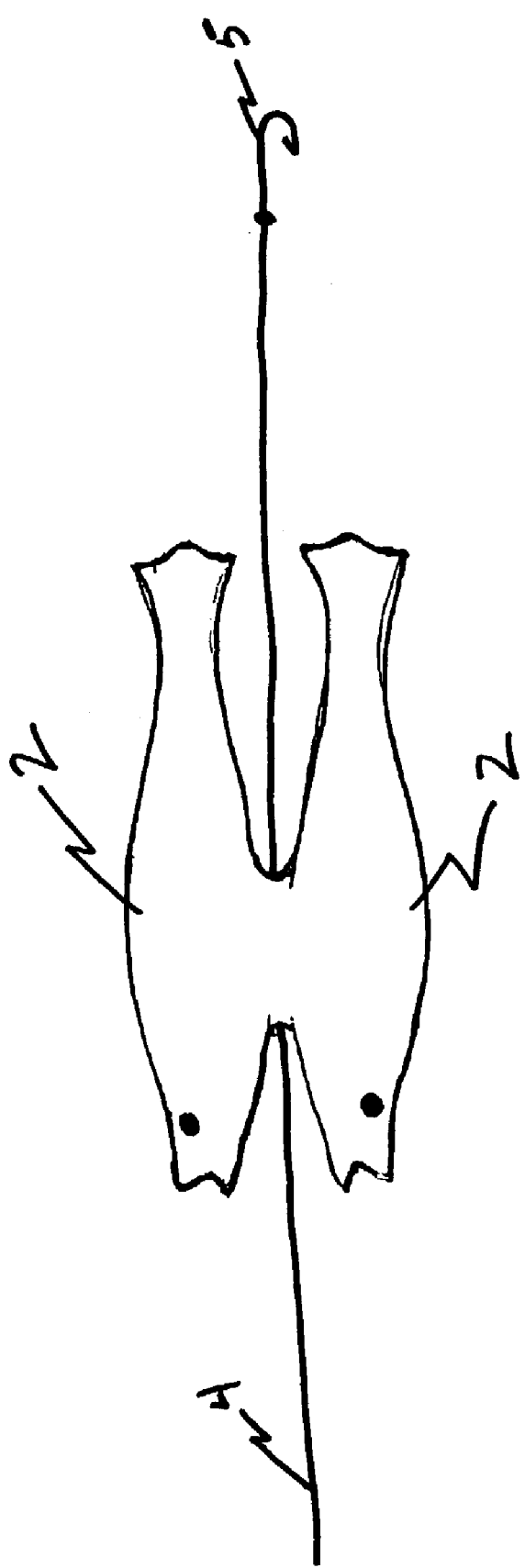
FIG. 5 shows a view of another embodiment of the fishing device according to the present invention.

FIG. 5 shows an embodiment of the fishing device according to the present invention where a first fish shaped decal (2) contains a holographic image of a fish on one side and the opposing side contains an adhesive material coating the surface of the first fish shaped decal (2). A fishing line or fishing leader (4) is disposed along a longitudinal axis of the first fish shaped decal (2) whereby a fishing hook, lure, bait or teaser (5) attached to the fishing line or fishing leader (4) extends beyond one end of the first fish shaped decal (2). A second fish shaped decal (2), which contains a holographic image of a fish on one side and is a mirror image of the first fish shaped decal (2), is disposed against the adhesive side of the first fish shaped decal (2), thereby enclosing a portion of the fishing line or fishing leader (4) between the first and second fish shaped decals (2). The first and second fish shaped decals (2), each a mirror image of the other, are attached along the side of the decal (2) that does not contain the holographic image of a fish, resulting in a holographic image of a fish visible on both sides of the attached first and second fish shaped decals (2). The fish shaped decals (2) may be manufactured from any number of suitable materials, though decals made of Mylar are preferred. The fish shaped decals (2) may be of various sizes and shapes. The fish shaped decals (2) may also include means for attracting fish selected from the group consisting of color, reflection, sound, motion, scent, and taste attractants.

What is claimed:

1. A method for creating an image of an individual fish or a school of fish moving in water, comprising:
    pulling a sheeting material along or through the water using a line attachment that attaches a fishing line or fishing leader to at least one point on said sheeting material, wherein the fishing line or fishing leader pulls said sheeting material along or through the water in a direction that is parallel to a length of the sheeting material and parallel to an upper surface of the water, and wherein the sheeting material flexes as the sheeting material is pulled along or through the water;
    wherein at least one fish shaped decal is adhered to at least one surface of said sheeting material being pulled along or through the water;
    wherein said sheeting material comprises at least one strip having a width that is perpendicular to and less than the length; and
    wherein, during the pulling, the sheeting material having the at least one decal flexes, thereby creating the image of the individual fish or the school of fish moving in the water as the fishing line or fishing leader pulls said sheeting material along or through the water parallel to the upper surface of the water;
    wherein at least one rigid bar extends along the width of said sheeting material, at least one line attachment that attaches the fishing line or fishing leader to at least one point on said rigid bar, said sheeting material is attached to said rigid bar alone an edge of said sheeting material, and said line attachment connects said rigid bar to said fishing line or fishing leader;
    wherein movable paddles are attached to each end of said rigid bar.

2. A method for creating an image of an individual fish or a school of fish moving in water, comprising:
    pulling a sheeting material along or through the water using a line attachment that attaches a fishing line or fishing leader to at least one point on said sheeting material, wherein the fishing line or fishing leader pulls said sheeting material along or through the water in a direction that is parallel to a length of the sheeting material and parallel to an upper surface of the water, and wherein the sheeting material flexes as the sheeting material is pulled along or through the water;
    wherein at least one fish shaped decal is adhered to at least one surface of said sheeting material being pulled along or through the water;
    wherein said sheeting material comprises at least one strip having a width that is perpendicular to and less than the length; and
    wherein, during the pulling, the sheeting material having the at least one decal flexes, thereby creating the image of the individual fish or the school of fish moving in the water as the fishing line or fishing leader pulls said sheeting material along or through the water parallel to the upper surface of the water;
    wherein at least one line attachment that attaches a fishing line or fishing leader to at least one point on a rigid hoop;
    wherein, one edge of said sheeting material is attached to said rigid hoop forming a cylinder; and
    wherein, the two edges of said sheeting material, perpendicular to the edge of said sheeting material attached to said rigid hoop, are sealed together.

3. The method of claim 2, wherein said at least one rigid hoop includes a plurality of rigid hoops of different sizes and shapes.

* * * * *